United States Patent [19]

Ferrante

[11] Patent Number: 4,605,606
[45] Date of Patent: Aug. 12, 1986

[54] GAUSSIAN LASER BEAM FILTER

[75] Inventor: Ronald A. Ferrante, Senecaville, Ohio

[73] Assignee: NCR Corporation, Dayton, Ohio

[21] Appl. No.: 707,163

[22] Filed: Feb. 28, 1985

Related U.S. Application Data

[63] Continuation-in-part of Ser. No. 519,441, Aug. 1, 1983, abandoned.

[51] Int. Cl.$^4$ ............................ G03H 1/10; G03H 1/18
[52] U.S. Cl. ............................................. 430/2; 430/1;
430/4; 430/321; 350/3.8; 350/3.86; 350/3.67;
372/9
[58] Field of Search ............................ 430/1, 2, 4, 321;
350/3.8, 3.86, 314, 3.67; 372/9

[56] References Cited

U.S. PATENT DOCUMENTS

| | | | |
|---|---|---|---|
| 3,149,968 | 9/1964 | Stephens | 430/4 |
| 3,465,347 | 9/1969 | Hudson | 350/314 |
| 3,582,326 | 6/1971 | Smithgall | 430/23 |
| 3,676,129 | 7/1972 | Ragland | 430/4 |

*Primary Examiner*—Richard L. Schilling
*Attorney, Agent, or Firm*—Wilbert Hawk, Jr.; Edward Dugas; Richard W. Lavin

[57] ABSTRACT

A method for constructing an optical filter for use in a holographic scanner includes exposing a photographic film to a laser, developing the film and reinserting the developed film into the unexpanded output beam of the laser to provide a uniform illumination of the outputted beam. The filter is positioned in the reference beam in the construction of a hologram used in the holographic scanner.

3 Claims, 7 Drawing Figures

GAUSSIAN LASER BEAM FILTER

This is a continuation-in-part of co-pending application Ser. No. 519,441 filed on Aug. 1, 1983 now abandoned.

BACKGROUND OF THE INVENTION

The present invention is directed to holographic scanning apparatus and more particularly to an optical filter for producing a light beam of uniform intensity.

A hologram is the name given to a photographic film having an interference pattern recorded thereon. The interference pattern is usually produced by a source of coherent light which is normally split into two beams, one of which is directed onto the sheet of photographic film, and the other of which is directed onto a subject. The beam directed onto the subject is scattered onto the sheet of film with waves of varied orientation and wave front curvature. The scattered light waves and the undisturbed beam are reunited at the film where they interfere as patterns of light and dark areas which are photographically recorded.

When a source of coherent light is directed through the patterned film sheet, it is diffracted into a number of diffraction orders. At least one of these orders duplicates the waves that were originally reflected from the subject, and a person viewing the film sees the subject of the hologram in three dimensions, with the subject appearing behind the hologram at a distance equal to the original subject to film distance. If the viewer changes his position and views the hologram from a different angle, the three-dimensional perspective changes and the viewer may thus look around an object in the foreground to see an object behind it.

Holograms have been utilized in scanning an object such as a UPC coded label to read the data contained therein. An example of such a scanning arrangement may be found in U.S. Pat. No. 4,224,509. In manufacturing the holograms used in the above cited scanning apparatus, a laser is used as a source of coherent light. Where it is required that coherent light be of uniform illumination, objective lenses are used to expand the beam and then limit the expansion with a collimating lens since the laser projects a beam whose cross-sectional profile is approximately Gaussian. In order to overcome this deficiency in a laser beam, optical filters have been proposed. An example of such a filter may be found in the U.S. Pat. No. 3,465,347 which consists essentially of a glass substrate with a spherical surface having a layer of light absorbing material. The cost of such a filter is quite expensive. It is therefore the principal object of this invention to provide a method of producing a low cost optical filter which will produce a beam from the laser having uniform intensity.

SUMMARY OF THE INVENTION

This and other objects of the invention are fulfilled by exposing a photographic film to the unexpanded output of a laser which is then developed and reinserted into the unexpanded output beam of the laser at its original location which functions as a filter for producing a uniform output of the laser beam used in the construction of a hologram.

BRIEF DESCRIPTION OF THE DRAWINGS

The foregoing and various other objects, advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
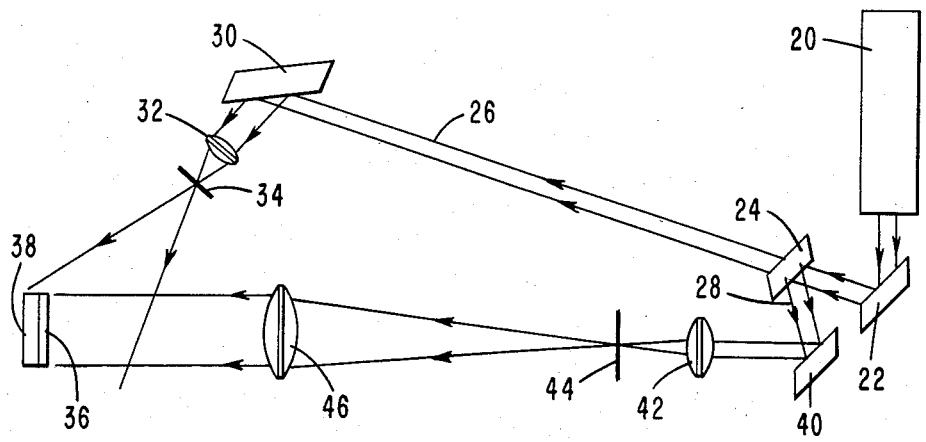
FIG. 1 is a schematic representation of a prior art system for constructing a holographic disc used in holographic scanning system.

Referring now to FIG. 1, there is shown a schematic representation of a prior art system for constructing a holographic disk which is used in a holographic scanning system. The system includes a 50 mW helium-neon laser 20 whose light output is directed toward a mirror 22 which deflects the light beam into a beam splitter 24 splitting the beam into two light beam segments 26 and 28. The beam segment 26 is directed toward the mirror 30 which deflects the beam segment through a spatial filter 32 which in turn directs the light beam through a pinhole spatial filter 34 for focusing on the mask 36 of the disc 38. The light beam segment 28 is directed to a mirror 40 which deflects the light beam segment through a spatial filter 42 which in turn directs the light beam segment through a pinhole spatial filter 44 toward a collimating lens 46 for directing the collimated light beam on the mask 36. The light beam segment 26, when focused on the mask 36, will function as the object beam, while the collimated light beam segment 28 transmitted through the lens 46 will function as a reference beam, thereby generating the interference fringes on the mask 36 which are exposed in a layer of dichromated gelatin located on the disc 38.

Figure 2:
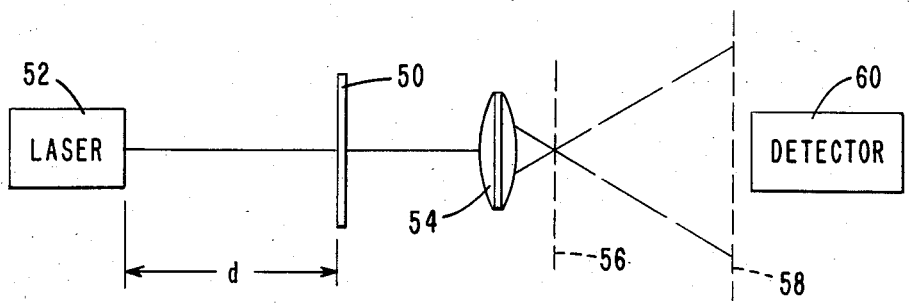
FIG. 2 is a schematic representation of a system for constructing the Gaussian beam filter of the present invention.

In order to reduce the cost of manufacturing the holographic disc 38, it was found that by exposing a photographic film to the unexpanded beam output of a laser and after developing the film, reinserting the exposed film at its original position, the output beam of the filter was of a uniform illumination. In fabricating such a filter, a photographic plate 50 (FIG. 2) such as Kodak 649F was inserted in front of a helium-neon laser 52 at a distance d in the unexpanded beam of the laser 52 exposing the plate to the light output of the laser. The exposed plate 50 was then developed for five minutes in Developer D-19, treating the plate for one minute in the Stop Bath SB-1, fixing the plate for ten minutes in a rapid fixer solution, washing the fixed plate in water for ten minutes, washing the plate for five minutes in a 50/50 solution of water and Isopropanol, washing the plate for five minutes in a 100% solution of Isopropanol and air drying the plate. After the plate has been dried, a cover plate is cemeted over the plate for environmental protection. After developing, the developed plate 50 was reinserted at its original position where it was found that the plate attenuated most strongly the central portion of the laser's output beam thus eliminating the original Gaussian irradiance profile of the laser beam. Where that portion of the laser beam has the highest light intensity, the corresponding portion of the developed photographic plate is the darkest limiting the amount of the light passing through the plate. Those portions of the laser having the lowest light intensity, the corresponding portion of the plate will be the lightest. In measuring the light output of the plate 50, the filtered output of the plate is directed through a microscopic object lens 54 and spatially filtered by pinhole filter 56 which produces a noise free, constant irradiance coherent laser beam projected on an output plane where the amount of light is detected and measured by an optical detector 58 such as the UDT Model 181 Radiometer.

Figure 3:
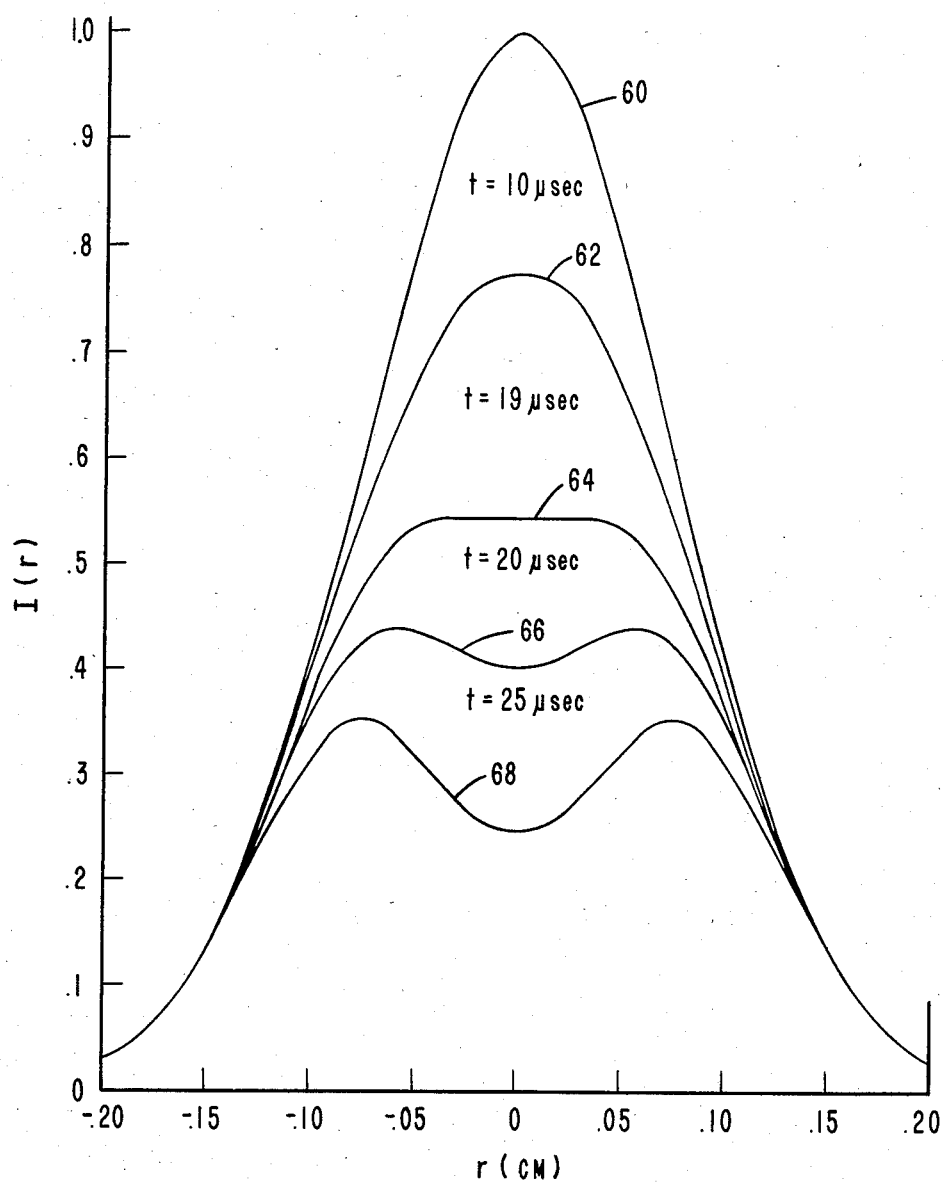
FIG. 3 is a diagram of the theoretical power transmission of a number of photographic Gaussian filters using Kodak 649F photographic plates.
Figure 4:
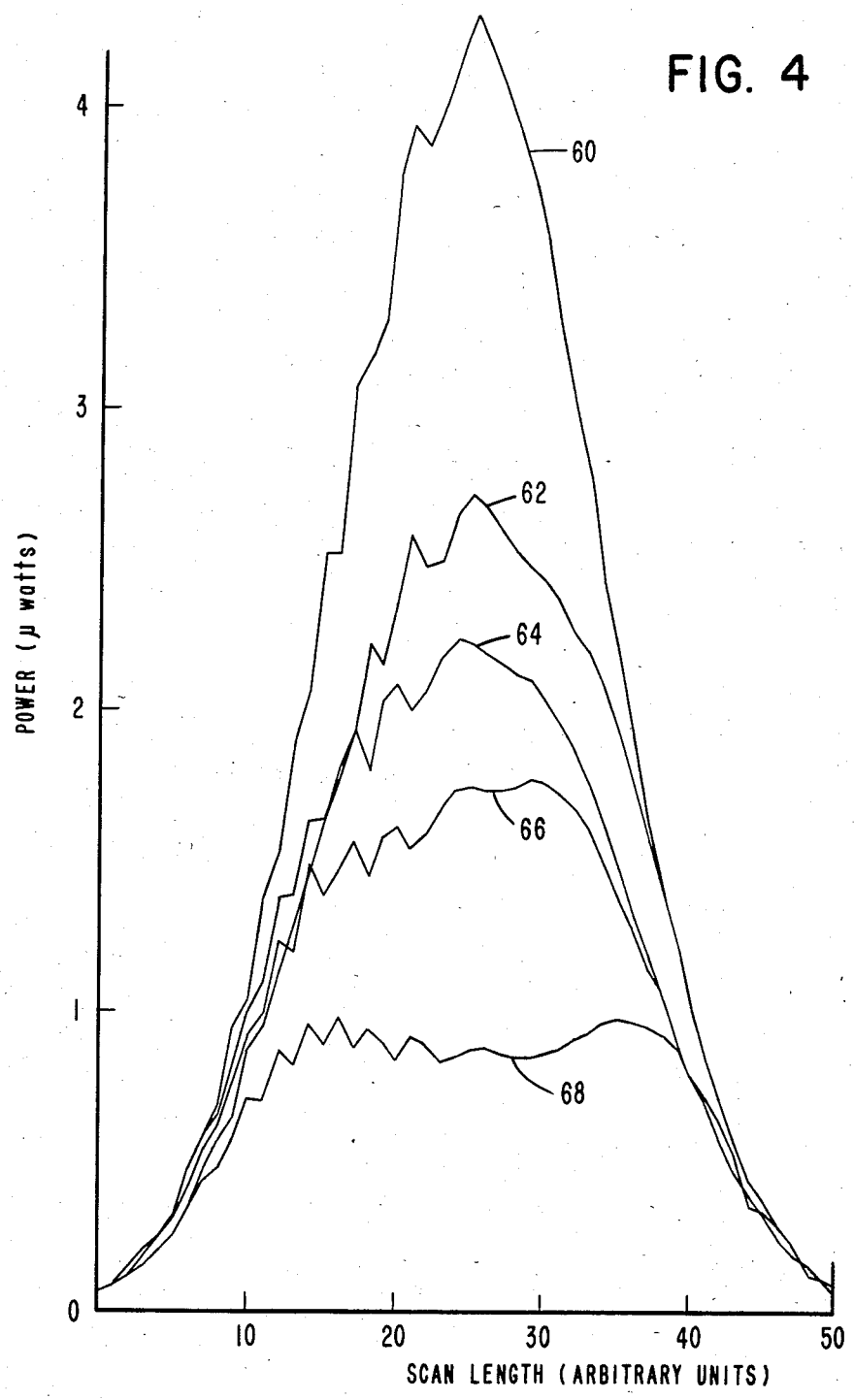
FIG. 4 is a diagram of the measured power transmission of the filters shown in FIG. 3.
Figure 5:
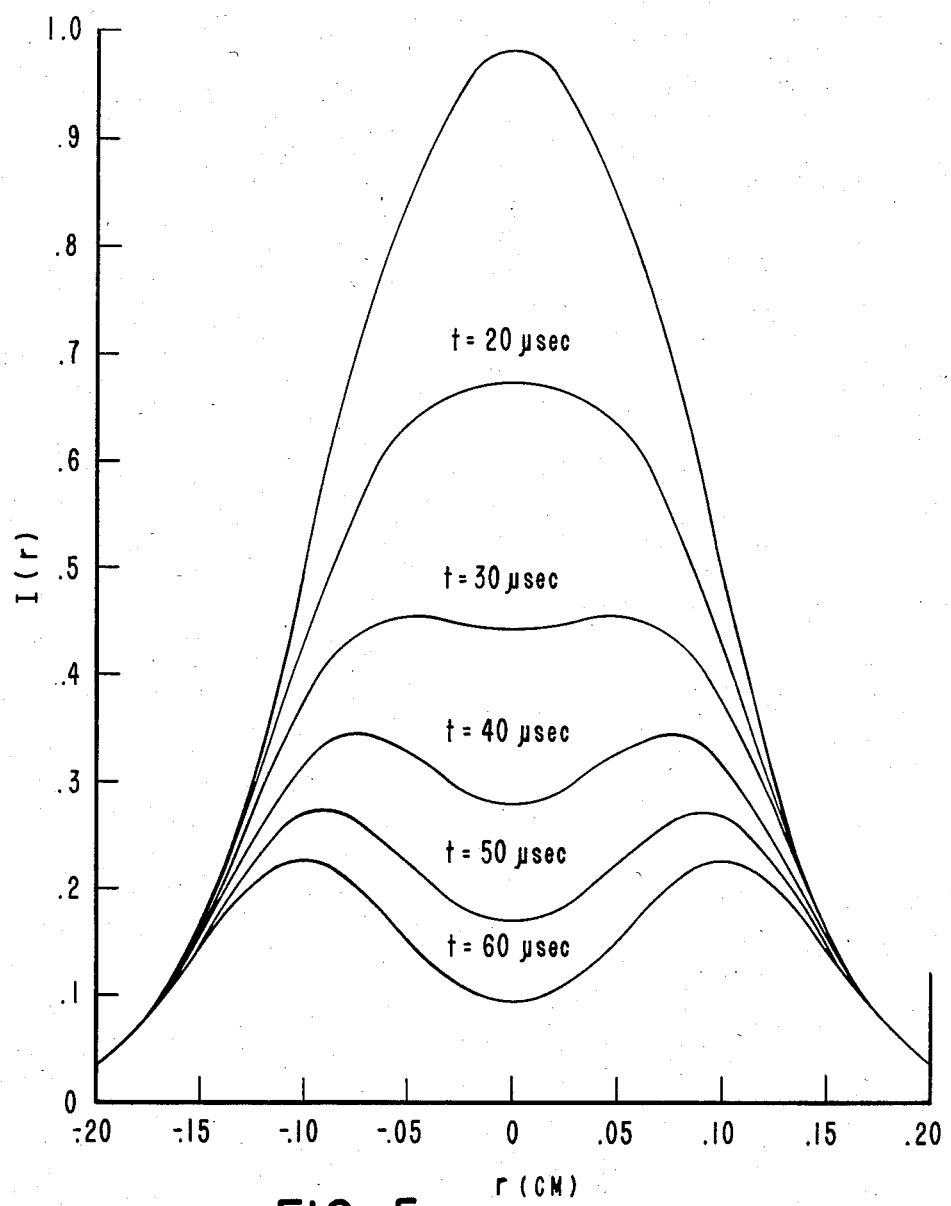
FIG. 5 is a diagram of the theoretical power transmission of a number of photographic Gaussian filters using Agfa 8E75HD photographic plates.
Figure 6:
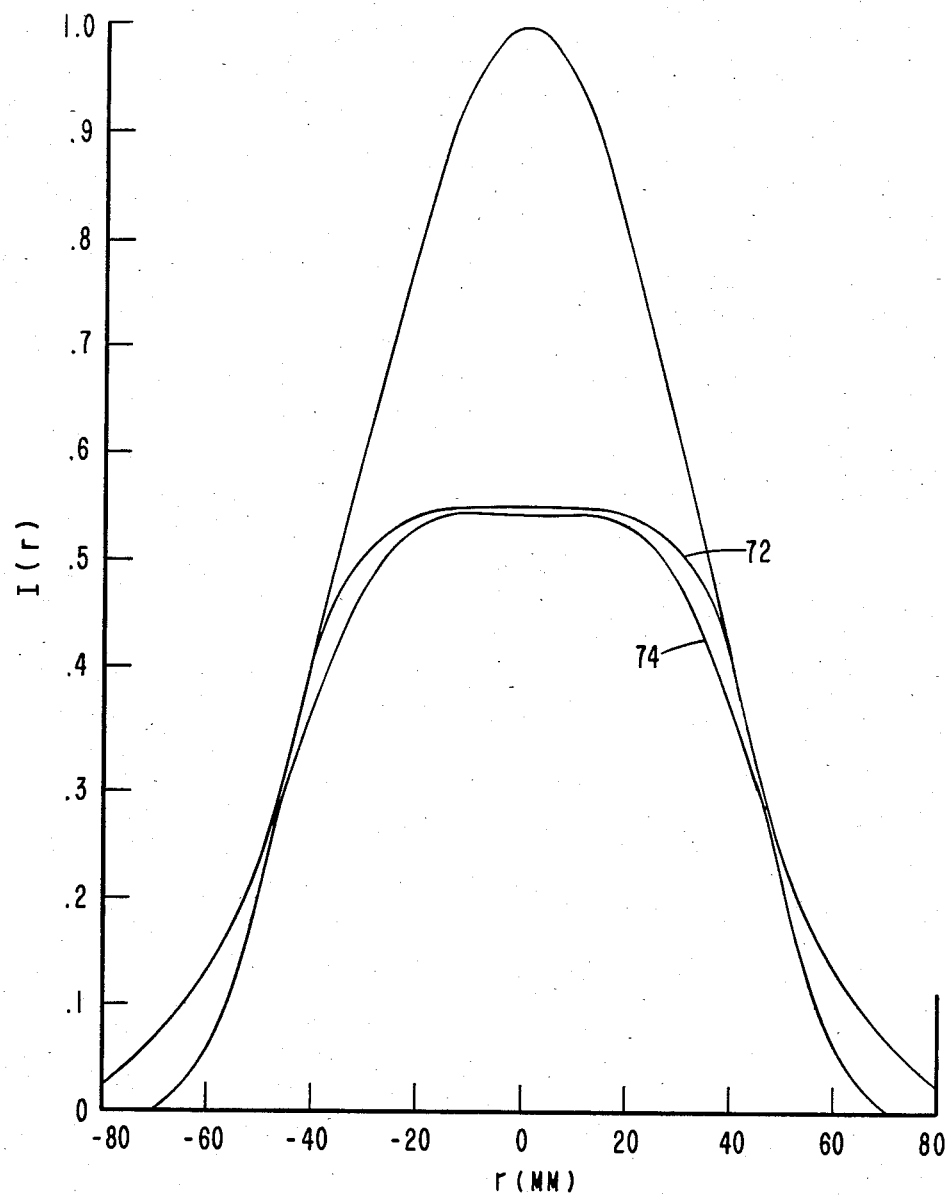
FIG. 6 is a diagram of a theoretical comparison of the fifth order filter and the Kodak 649F photographic plate.

Referring now to FIGS. 3 and 4, there is shown a diagram of the irradiance profile of a number of filters recorded on Kodak 649K on photographic plates and constructed in accordance with the present invention. FIG. 3 shows the theoretical filter transmission while FIG. 4 shows the measured transmission for the same filter. Curve 60 and both FIGS. 3 and 4 disclose the irradiance profile of the power transmission of a laser without a filter showing the pronounced Gaussian effect. Curve 62 shown in FIG. 4 shows the output of a filter exposed to the output of a laser for 0.10 seconds; curve 64 is exposed for 0.106 seconds; curve 66 exposed 0.119 seconds and curve 68 exposed for 0.163 seconds. It will be seen from FIG. 4 that as the time of exposure of the filter to the laser output increases, a flattening of the sharply peaked Gaussian input beam transmitted through the photographic filter occurs. In a similar manner FIG. 5 shows the theoretical irradiance profile of a number of filters recorded on Agfa 8E75HD photographic plates while FIG. 6 is a theoretical comparison of a fifth order filter and the Kodak 649K photographic filter. It will be seen in comparing the curve of FIG. 5 with those of FIG. 3 that the response of both emulsions are very similar in which both Figures predict a flattening of the Gaussian input beam. At higher exposures overmodulation is seen to produce a "hole" in the beam center. For comparison, FIG. 6 shows the curve 72 of the fifth order filter to have a slightly broader correction than the curve 74 of the 649F filter with a somewhat more rapid edge fall-off, both desirable filter characteristics. It is obvious that the photographic absorption filter constructed in accordance with the invention is very inexpensive compared to the manufactured metallic thin film filters.

Figure 7:
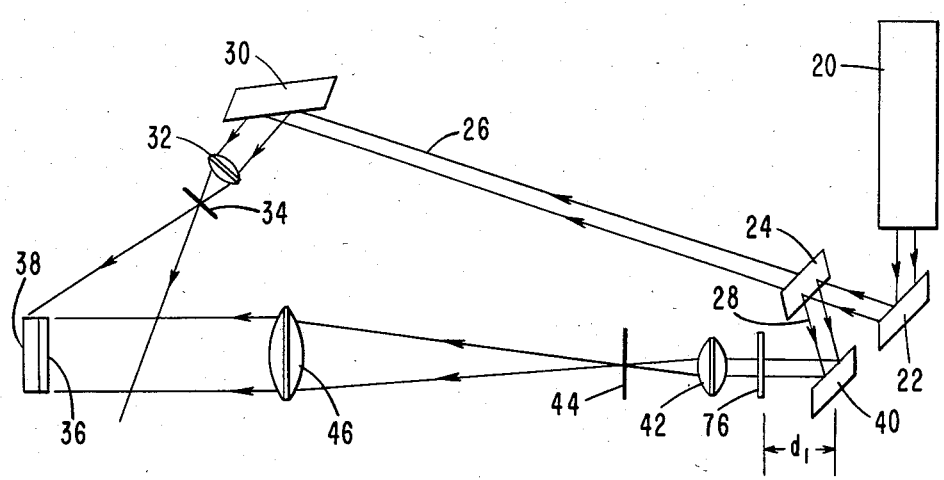
FIG. 7 is a schematic representation of a system for construction of a holographic disk utilizing the present invention.

Referring now to FIG. 7, there is shown a schematic representation of the construction of a holographic disk utilizing the optical filter of the present invention. FIG. 7 is similar to FIG. 1 with similar elements having the same numerical designation. In fabricating the holographic disk 38, the photographic plate 76, such as a Kodak 649F, is inserted into the unexpanded reference beam portion 28 of the laser 20 at a distance $d_1$ from the mirror 40, exposing the plate to the light output of the laser. After developing the plate in the manner previously described, the developed plate 76 is reinserted at its original position in the reference beam portion of the laser 20 producing a noise free, constant irradiance coherent reference laser beam which generates interference fringes on the mask 36 which are exposed in the layer of the dicromated gelatin located on the disk 38.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for the construction of a hologram for use in a scanning system comprising the steps of;
    providing a source of coherent light having an intensity which varies from point to point over its cross-sectional area in accordance with a predetermined Gaussian function;
    splitting the light beam into first and second unexpanded light beams;
    focusing the first unexpanded light beam onto an object through a first spatial filter for expanding the light beam as it strikes the object;
    positioning a photographic film in the second unexpanded light beam at a predetermined distance from the source of coherent light;
    developing the exposed photographing film for a predetermined time period;
    reinserting the developed film in the second unexpanded light beam at said predeveloped distance from the source to cause said unexpanded coherent light beam to have a uniform intensity when emerging from the film;
    focusing the uniform intensity second light beam through a second spatial filter onto a collimating lens which emits a collimated light beam;
    and directing the collimated light beam onto a recording medium located adjacent the object.

2. The method of claim 1 in which the filter comprises Kodak 649F photographic film exposed for 0.163 seconds to the source of light.

3. The method of claim 1 in which the first and second light beams are each focused through a pin hole spatial filter.

* * * * *

UNITED STATES PATENT AND TRADEMARK OFFICE
CERTIFICATE OF CORRECTION

PATENT NO. : 4,605,606

DATED : August 12, 1986

INVENTOR(S) : Ronald A. Ferrante

It is certified that error appears in the above—identified patent and that said Letters Patent is hereby corrected as shown below:

Column 4, line 41 delete "predeveloped" and substitute --predetermined--.

Signed and Sealed this

Thirtieth Day of December, 1986

Attest:

DONALD J. QUIGG

Attesting Officer

Commissioner of Patents and Trademarks